L. V. LING.
PORCH SWING HANGER.
APPLICATION FILED MAY 20, 1916.
1,218,194.
Patented Mar. 6, 1917.
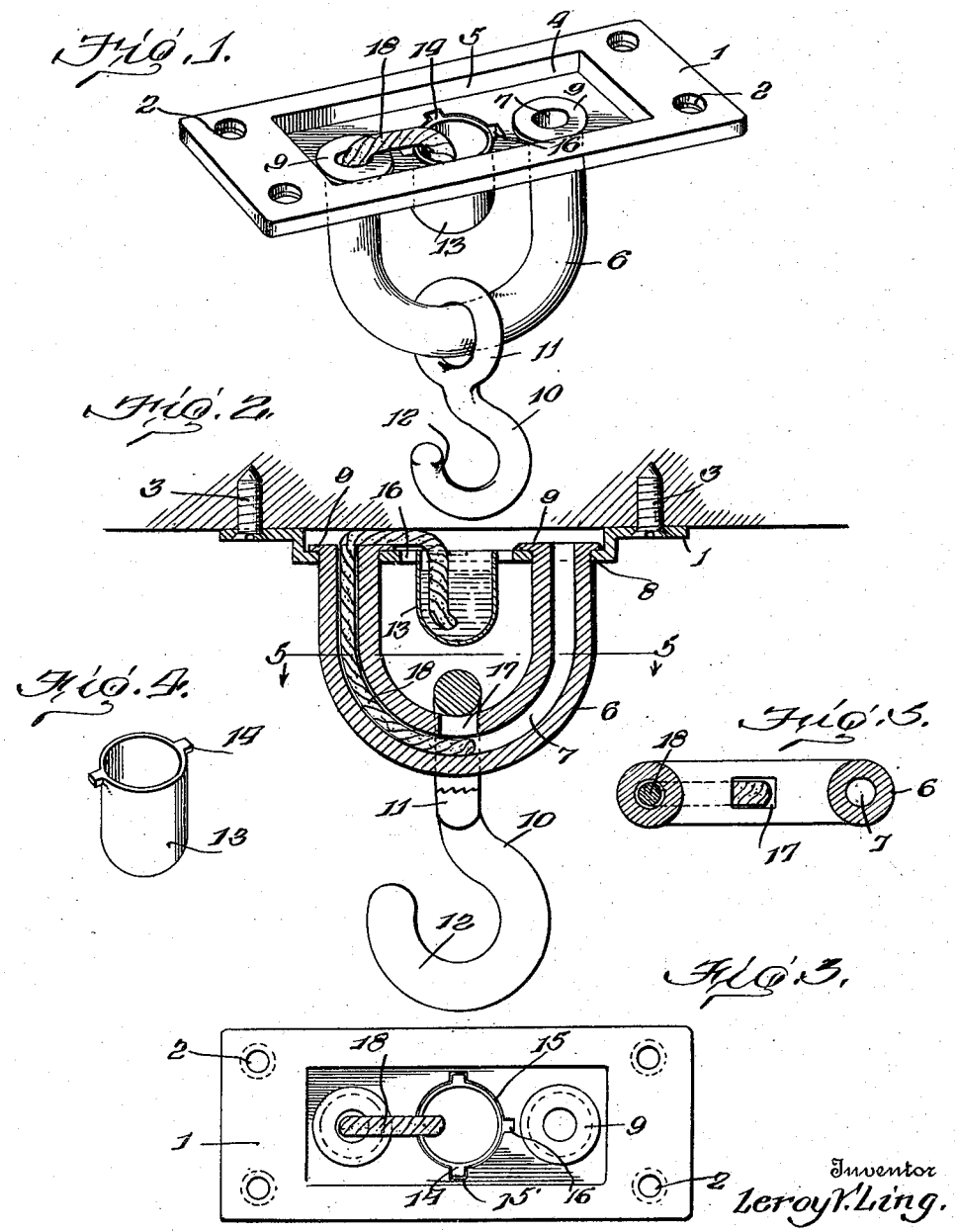
Inventor
Leroy V. Ling.

UNITED STATES PATENT OFFICE.

LEROY V. LING, OF JOHNSTOWN, PENNSYLVANIA.

PORCH-SWING HANGER.

1,218,194.

Specification of Letters Patent.

Patented Mar. 6, 1917.

Application filed May 20, 1916. Serial No. 98,843.

*To all whom it may concern:*

Be it known that I, LEROY V. LING, a citizen of the United States, residing at Johnstown, in the county of Cambria and State of Pennsylvania, have invented certain new and useful Improvements in Porch-Swing Hangers, of which the following is a specification.

This invention has as its object to provide an improved hanger for suspending porch swings and other similarly suspended structures and has as its primary aim to provide a device of this class which will be self-lubricating so that the rubbing contact of the elements comprising the device will not result in disagreeable noises while the swing is in use.

It is another aim of the invention to so construct the lubricant container and to so assemble the same with the remainder of the structure that the said container may be readily removed whenever it becomes necessary to supply the same with lubricant.

Another aim of the invention is to so construct the device that the same will be substantial and durable and further so that the means provided for supplying lubricant between the rubbing parts of the device will not be subjected to any strain whatsoever, which would be likely to soon render it inoperative and thereby impair the efficiency of the device as a whole.

In the accompanying drawings:

Figure 1 is a perspective view of the device embodying the present invention.

Fig. 2 is a vertical longitudinal sectional view therethrough applied.

Fig. 3 is a top plan view of the device.

Fig. 4 is a perspective view of the lubricant container of the device.

Fig. 5 is a horizontal sectional view through the hanger member on the line 5—5 of Fig. 2.

The device embodying the present invention includes an attaching plate which is indicated by the numeral 1 and which is preferably rectangular and provided in its four corners with openings 2 for the passage of securing screws 3 or other suitable fastening elements whereby the said plate may be firmly secured to the roof of a porch or to any other suitable support from which the swing or other structure is to be suspended, and for a purpose which will be presently made clear the plate is depressed at its midportion as indicated by the numeral 4, so as to form, in the upper face of the said plate, a recess 5. The hanger member of the device is preferably in the nature of a U-shaped bail which is indicated by the numeral 6 and which is hollow or in other words provided with a continuous bore 7 which extends from end to end thereof, and the arms of this bail are fitted through openings 8 formed in the sunken portion of the plate 1 and headed or riveted as at 9 so as to permanently unite the bail with the said plate and to insure against the ends of the said arms being pulled loose from the plate. A suspension hook 10 is provided with an eye 11 which loosely fits the connecting portion of the bail 6, the bill of this hook being indicated by the numeral 12. It will be understood, of course, that the suspension ropes or chains for the swing or other structure are to be connected with the bill of the hook 10 and that while the swing is in motion the eye of the hook will rock upon or ride over the said connecting portion of the bail and the invention contemplates the provision of means for applying lubricant to the contacting portions of the eye 11 and bail 6 in a manner which will now be explained.

The numeral 13 indicates the lubricant container which is preferably in the nature of a metallic cup open at its top and provided with diametrically oppositely located lugs 14 which project outwardly substantially in a plane with the upper edge of the said container and in assembling the container with the remainder of the structure the upper end of the said container is inserted upwardly through an opening 15 formed in the sunken portion 4 of the plate at a point between the openings 8 therein, the lugs 14 passing through notches 16 formed at diametrically opposite points in the wall of the said opening 15 and the container after such insertion being rotated a quarter of a turn so as to permit of the said lugs 14 seating in recesses 15' formed at diametrically opposite points in the upper face of the said sunken portion of the plate. In this manner the container is firmly supported and held against accidental rotation, although when it is desired to replenish the same with lubricant the container may be again rotated after being slightly lifted, and readily detached from the plate for the purpose stated. Inasmuch as the upper face of the plate is sunken this manipulation of the container will not be interfered with by the roof of the porch or other structure. A lubricant passage 17 is formed in the upper side of the connecting portion of the bail 6 and in order that lubricant may be conveyed from the container 13 to the said passage 17, a suitable length of wick, indicated by the numeral 18, is inserted into the bore 7 of the bail through the end of one arm thereof and one end of said wick is caused to lie within the body of lubricant in the said container, as clearly shown in Figs. 1 and 2 of the drawings, the other end of the wick being positioned opposite the passage 17.

The lubricant is drawn by capillary attraction through the wick from the container to the said passage and is supplied to the rubbing or contacting surfaces of the eye 11 and bail 6.

Having thus described the invention, what is claimed as new is:

1. In a device of the class described, an attaching member, a hanger bail supported thereby and having a bearing portion, a suspension element loosely fitting the said bearing portion of the bail, an oil reservoir, and means for conducting oil from the reservoir to the said bearing portion of the hanger member.

2. In a device of the class described, an attaching member, a hanger member supported by the attaching member and comprising a tubular bail having an opening in its bearing portion communicating with the bore of the bail, a lubricant container carried by the attaching member, and a length of wick fitting within the bore of the said hanger member and having one end terminating substantially at the said opening in the hanger member and its other end extending into the said lubricant container.

3. In a device of the class described, an attaching member, a hanger member supported by the attaching member and comprising a tubular bail having an opening in its bearing portion communicating with the bore of the bail, a lubricant container carried by the attaching member, and a length of wick fitting within the bore of the said hanger member and having one end terminating substantially at the said opening in the hanger member and its other end extending into the said lubricant container, the said lubricant container being detachably connected with the said attaching member.

In testimony whereof I affix my signature.

LEROY V. LING. [L. S.]

Copies of this patent may be obtained for five cents each, by addressing the "Commissioner of Patents, Washington, D. C."